(12) United States Patent
Bell

(10) Patent No.: US 7,000,927 B2
(45) Date of Patent: Feb. 21, 2006

(54) LEVELING SENSOR/SWITCH W/HYDRAULIC CONTROL VALVE FOR VEHICLE LEVELING SYSTEMS

(76) Inventor: James Robert Bell, 26066 Fountainbleu Dr., Sun City, CA (US) 92586

( * ) Notice: Subject to any disclaimer, the term of this patent is extended or adjusted under 35 U.S.C. 154(b) by 179 days.

(21) Appl. No.: 10/237,459

(22) Filed: Nov. 12, 2002

(65) Prior Publication Data

US 2004/0090021 A1 May 13, 2004

(51) Int. Cl.
*B60G 17/00* (2006.01)

(52) U.S. Cl. .................................. 280/6.153
(58) Field of Classification Search .............. 280/6.151, 280/6.152, 6.153, 6.154, 6.155, 6.157; 254/423; 200/220, 233, 226
See application file for complete search history.

(56) References Cited

U.S. PATENT DOCUMENTS

| | | | | |
|---|---|---|---|---|
| 3,761,653 A | * | 9/1973 | Eranosian ................ 200/61.51 |
| 3,836,161 A | * | 9/1974 | Buhl ........................ 280/6.153 |
| 3,917,307 A | * | 11/1975 | Shoebridge ................. 280/104 |
| 4,099,040 A | * | 7/1978 | Bitko .......................... 200/220 |
| 4,746,133 A | * | 5/1988 | Hanser et al. ........... 280/6.153 |
| 5,890,721 A | * | 4/1999 | Schneider et al. ....... 280/6.153 |
| 6,050,573 A | * | 4/2000 | Kunz ....................... 280/6.153 |
| 6,684,138 B1 | * | 1/2004 | Friede et al. ................. 701/36 |

* cited by examiner

Primary Examiner—David R. Dunn

(57) ABSTRACT

This invention consists of a Level Sensing Device and Hydraulic Control Valve, which, when, as a team, is applied to a system with a Hydraulic Pump W/Oil Reservoir, three or four Hydraulic Jacks, three or four Normally-Open Solenoid-Operated In-Line Hydraulic Valves, and piped and wired as described in this document, will provide a completely automatic leveling system for Recreational Vehicles, such as, Motorhomes, Pick-up Campers, and Camping Trailers. This Leveling Sensor/Switch and Hydraulic Control Valve can also be retro-fit into any exsisting manually-operated or semi-automatic hydraulic leveling system and, as a team, make it a completely automatic leveling system.

2 Claims, 17 Drawing Sheets

Figure 1:
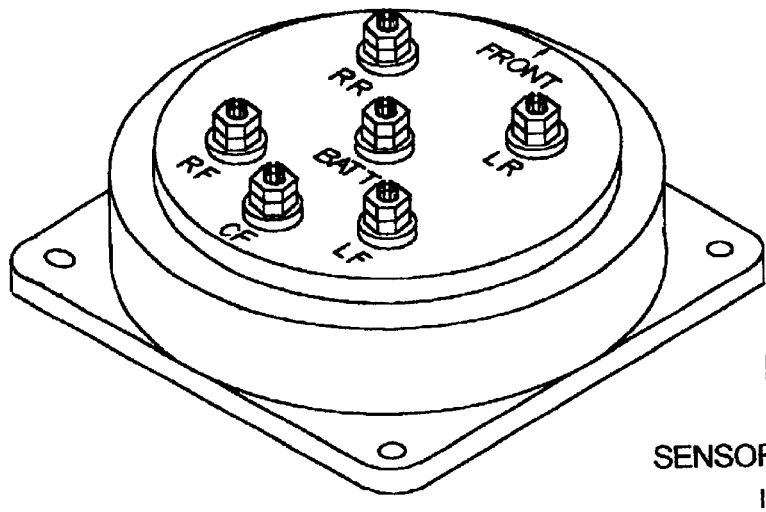

Wiring & Piping Diagram for 3-Jack System

SENSOR/SWITCH ASS'Y
ISOMETRIC

CONTROL VALVE ASS'Y
ISOMETRIC

Wiring & Piping Diagram for 4-Jack System

Wiring & Piping Diagram for 3-Jack System

Electrical schematic
for 4-Jack System

Electrical schematic
for 3-Jack System

MFG. NOTES:

⚠1 PARTS 101 & 102 TO BE CONCENTRIC & FUSED OR CEMENTED TOGETHER WITH HIGH-INTEGRITY ADHESIVE TO HOLD VACUUM.

⚠2 PARTS 105 TO BE FUSED OR CEMENTED TO PART 102 WITH HIGH-INTEGRITY ADHESIVE TO HOLD VACUUM.

⚠3 MERCURY TO BE COMMERCIAL GRADE & FREE OF OXIDATION. TOP SURFACE OF MERCURY TO BE LEVEL WITH PART 101 WITHIN +.000" TO -.005" WHILE ASS'Y IS IN A LEVEL POSITION.

⚠4 PARTS 107 TO PENETRATE SURFACE OF MERCURY +.001" TO +.003" WHILE ASS'Y IS IN A LEVEL POSITION & IN A VACUUM.

⚠5 PART 106 CONDUCTOR & PARTS 107 ELECTRODES TO BE LOCKED IN PLACE & SEALED WITH HIGH-INTEGRITY ADHESIVE WHILE IN VACUUM.

⚠6 CAVITY TO BE IN A VACUUM.

⚠7 WHEN INSTALLING UNIT ON VEHICLE, VEHICLE MUST BE LEVEL & SENSOR ASS'Y MUST BE LEVEL WITH "FRONT" MARKING CONSISTENT WITH FRONT OF VEHICLE.

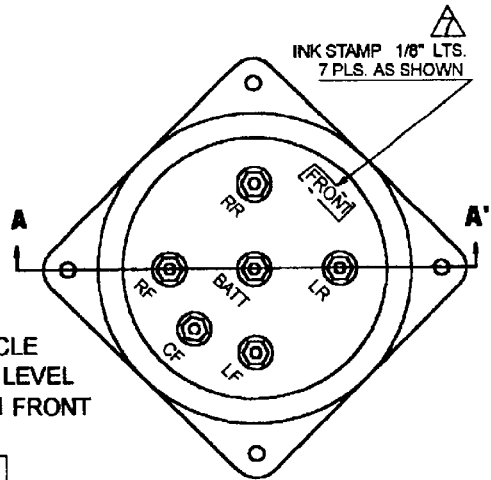

INK STAMP 1/8" LTS. 7 PLS. AS SHOWN

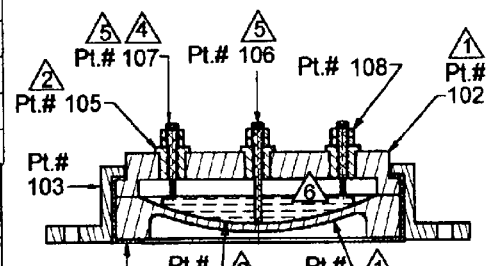

SECTION A-A'

| Sht# | Pt.# | No. Req'd | Nomenclature | Material |
|---|---|---|---|---|
| 4 | 110 | 1 | MOMENTARY SWITCH, N.C. | |
| 6 | 109 | | MERCURY | 1.9 IN³ (APPROX.) |
| 6 | 108 | 12 | LOCK NUT | #8-32 HEX NUT |
| 9 | 107 | 5 | ELECTRODE | MOLYBDENUM |
| 9 | 106 | 1 | CONDUCTOR | MOLYBDENUM |
| 9 | 105 | 6 | BUSH'G THRD'D | 304 S.S. |
| 8 | 104 | 1 | GROMMET | RUBBER |
| 8 | 103 | 1 | RING, MTG. | ALUMINUM |
| 7 | 102 | 1 | BASE, UPPER | GLASS |
| 7 | 101 | 1 | BASE, LOWER | GLASS |
| 6 | 100 | 1 | ASSEMBLY | |

BILL OF MATERIAL
Pt.# 100
SENSOR/SWITCH ASS'Y

Fig. 7

Pt.# 107
ELECTRODE
MAT'L. MOLYBDENUM

Pt.# 106
CONDUCTOR
MAT'L. MOLYBDENUM

Pt.# 105
BUSHING, THREADED
MAT'L. 304 STAINLESS STEEL

⚠6 See Sht. 11/17
Hole #

9 - "R" (.339) Drill, FB, .50" Dp., 1/8-27 NPT Tap.

10- "R" (.339) Drill, FB, .50" Dp., 1/8-27 NPT Tap.

11- "R" (.339) Drill, FB, .50" Dp., 1/8-27 NPT Tap.

12- "R" (.339) Drill, FB, .50" Dp., 1/8-27 NPT Tap.

13- "R" (.339) Drill, FB, .50" Dp., 1/8-27 NPT Tap.   ,#31 (.120) Drill, .97" Dp.

14- "R" (.339) Drill, FB, .50" Dp., 1/8-27 NPT Tap.   ,#31 (.120) Drill, .97" Dp.

15- "R" (.339) Drill, FB, .50" Dp., 1/8-27 NPT Tap.   ,#31 (.120) Drill, .97" Dp.

16- "R" (.339) Drill, FB, .50" Dp., 1/8-27 NPT Tap.   ,#31 (.120) Drill, .97" Dp.

17- "R" (.339) Drill, FB, .50" Dp., 1/8-27 NPT Tap.   #31 (.120) Drill, 1.38" Dp.

18- "R" (.339) Drill, FB, .50" Dp., 1/8-27 NPT Tap.   , #31 (.120)" Drill, .88" Dp 19- "R" (.339) Drill, FB, .50" Dp., 1/8-27 NPT Tap.   , #31 (.120) Drill, .88" Dp.

20 - #31 (.120) Drill, 1.20" Dp., .125 P.F. Ream,.62" Dp.   (For 1/8"DIA. X 5/8" Lg. Steel Dowel.)

21 - #31 (.120)Drill, 1.20" Dp.,.125 P.F. Ream,.62" Dp. (For 1/8" DIA. X 5/8" Lg. Steel Dowel.)

22 - #31 (.120) Drill, 1.69" Dp.,.125 P.F. Ream,.38 Dp.   (For 1/8" DIA. x 3/8" Lg. Steel Dowel.)

23 - #31(.120) Drill,1.75"Dp.,.125 P.F. Ream,.38" Dp.   (For 1/8" DIA. X 3/8" Lg. Steel Dowel.)

24 - #31(.120) Drill,1.75"Dp.,.125 P.F. Ream,.38" Dp.   (For 1/8" DIA. X 3/8" Lg. Steel Dowel.)

25 - #31 (.120) Drill, 1.75" Dp.,.125 P.F. Ream,.75" Dp.   (For 1/8"DIA. X 3/4" Lg.Steel Dowel.)

26 - #31 (.120) Drill, 1.75" Dp.,.125 P.F. Ream,.75" Dp.   (For 1/8"DIA. X 3/4" Lg.Steel Dowel.)

27 - #31 (.120) Drill, 2.50" Dp.,.125 P.F.Ream, 1.00" Dp. (For 1/8"DIA. X 1" Lg.Steel Dowel.)

28 - #31 (.120)Drill,.88" Dp.,.125 P.F. Ream,.75 Dp.   (For 1/8" DIA. X 3/4" Lg. Steel Dowel)

29 - #31 (.120) Drill, 3.38" Dp.,.125 P.F. Ream,..75" Dp.   (For 1/8" DIA. X 3/4" Lg. Steel Dowel)

30 - #31 (.120) Drill, 2.56" Dp.,.125 P.F. Ream,.75" Dp.   (For 1/8" DIA. X 3/4" Lg. Steel Dowel)

Fig. 8B

Pt.# 211
PLATE, DEPRESSOR
MAT'L: 3/16" Ground Flat Stock

Pt.# 212
PLATE, DEPRESSOR
MAT'L: 3/16" Ground Flat Stock

Pt.# 210
GASKET
MAT'L: .016" Fibrous Gasket Sht.

NOTES:
1. INK-STAMP, SIZE OPTIONAL LOCATION APPROX. AS SHOWN
2. Install #10-32 X 1/2" Lg. SHSS.

Pt.# 209
PLATE, MOUNTING
MAT'L: 1/4" Alum. Tooling Plate

Pt.# 215
CAM HANDLE
MAT'L: -1: STEEL ROD
-2: #10-32 X 1/2" Lg. SHSS.

CONTROL PANEL CONCEPT

LEVELING SENSOR/SWITCH W/HYDRAULIC CONTROL VALVE FOR VEHICLE LEVELING SYSTEMS

BACKGROUND AND SUMMARY

There are many Leveling Systems for land vehicles of the recreational type, such as, RV's, Pick-up Campers, and Camper trailers, and such. They are all mainly comprised of:

(a) A medium, such as, Air, or Hydraulic Fluid to provide the elevating forces that are pumped to Jacks.

(b) In the case of the Hydraulic System, a Hydraulic Pump W/Reservoir from which to pump the fluid to a plurality of three or four Jacks, thus extending the Jacks, and to receive and store that same fluid from the Jacks when the Jacks are being retracted.

(c) A plurality of three or four Hydraulic Jacks placed strategically on the vehicle in such a way as to raise the various vehicle points to attain a level attitude of the vehicle.

(d) A piping system to provide the delivery of the fluid from the Pump to the Jacks.

(e) A sensing device to sense the relative out-of-level condition of the vehicle to the ground and send signals to the Pump and Jacks to effect a level attitude of the vehicle.

It is not the Inventor's intent to reinvent the leveling systems as we presently know them, but to add a choice to the installer and the customer of a Leveling Sensor and Controller which is completely automatic, simple to operate, and is essentially maintenance-free. To that extent this Invention focuses on the elements (d) and (e) of the previous paragraph. It consists of a LEVEL SENSOR/SWITCH that senses the out-of-level relationship of the vehicle to that of the ground on which it is parked. The LEVEL SENSOR/SWITCH then sends electrical signals to the In-line Solenoid-operated Hydraulic Valves in the piping lines to the various Jacks. These signals will control the fluid delivery "on" and "off" to the various Jacks as required to extend the Jacks to achieve a level attitude of the vehicle.

The HYDRAULIC CONTROL VALVE provides the means of delivering fluid to the upper chambers of the Jacks when wanting to raise or level the vehicle, and, in the case of double-acting Jacks, to allow the fluid in the lower chambers of the Jacks to return to the Oil Reservoir. Also, in the case of double-acting Jacks, it provides the means of delivering fluid to the lower chambers of the Jacks when wanting to lower the vehicle by retracting the Jacks. It also, then, allows the fluid in the upper chambers of the Jacks to return to the Oil Reservoir.

BRIEF DESCRIPTION OF THE DRAWING SHEETS

FIG. 1: Shows the SENSOR/SWITCH ASS'Y. (Also see FIG. 7 drawing sheet). It is essentially a glass vial with a spherical floor upon which floats a pool of Liquid Mercury. There is an electrical conductor at the center and is always immersed in the pool of Mercury, regardless of the tilt of the unit. Around the center conductor is a circle of five electrodes placed as shown, and all are barely in contact with the Mercury when the unit is in a level attitude. Thus, in any condition of tilt of the unit, some electrodes will be in contact with the Mercury and some will not. The markings, RR, LR, RF, LF, and CF indicate which Jack position the electrode controls. The marking, FRONT, indicates the relative position of direction in the vehicle.

Figure 2:
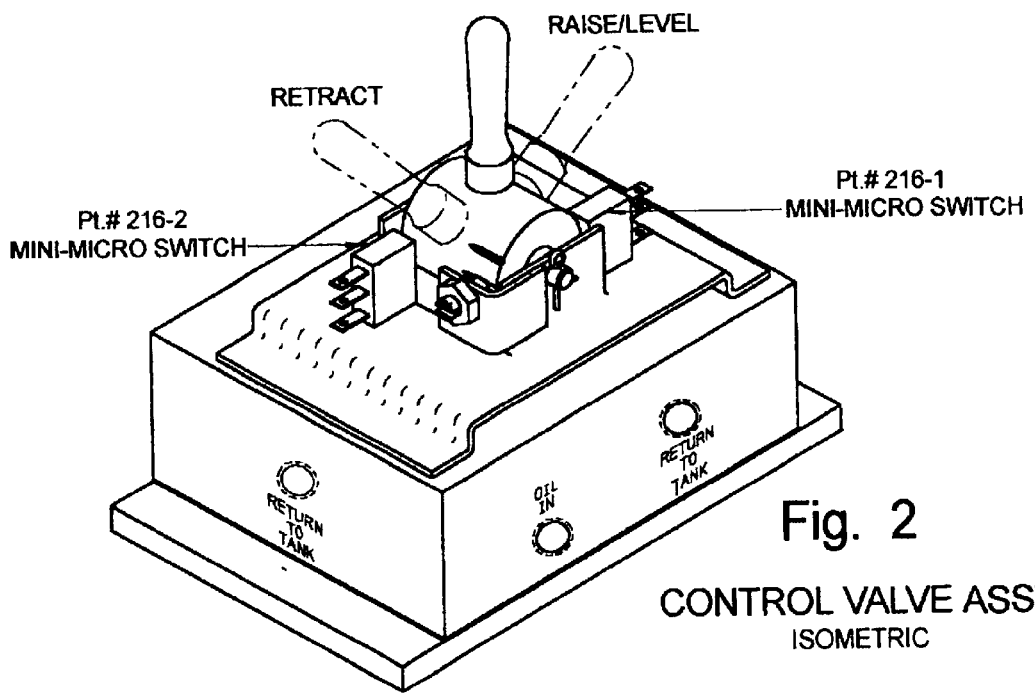

FIG. 2: Shows the Control Valve Ass'y. with its control lever for selecting the mode for leveling and/or raising the vehicle, or its mode for retracting the Jacks to their "UP" position. Mini-Micro Switch, Pt.# 216-1, provides electric current to the Hydraulic Pump and the Sensor/Switch Ass'y. Mini-Micro Switch, Pt.# 216-2, provides electric current to the Hydraulic Pump only.

Figure 3:
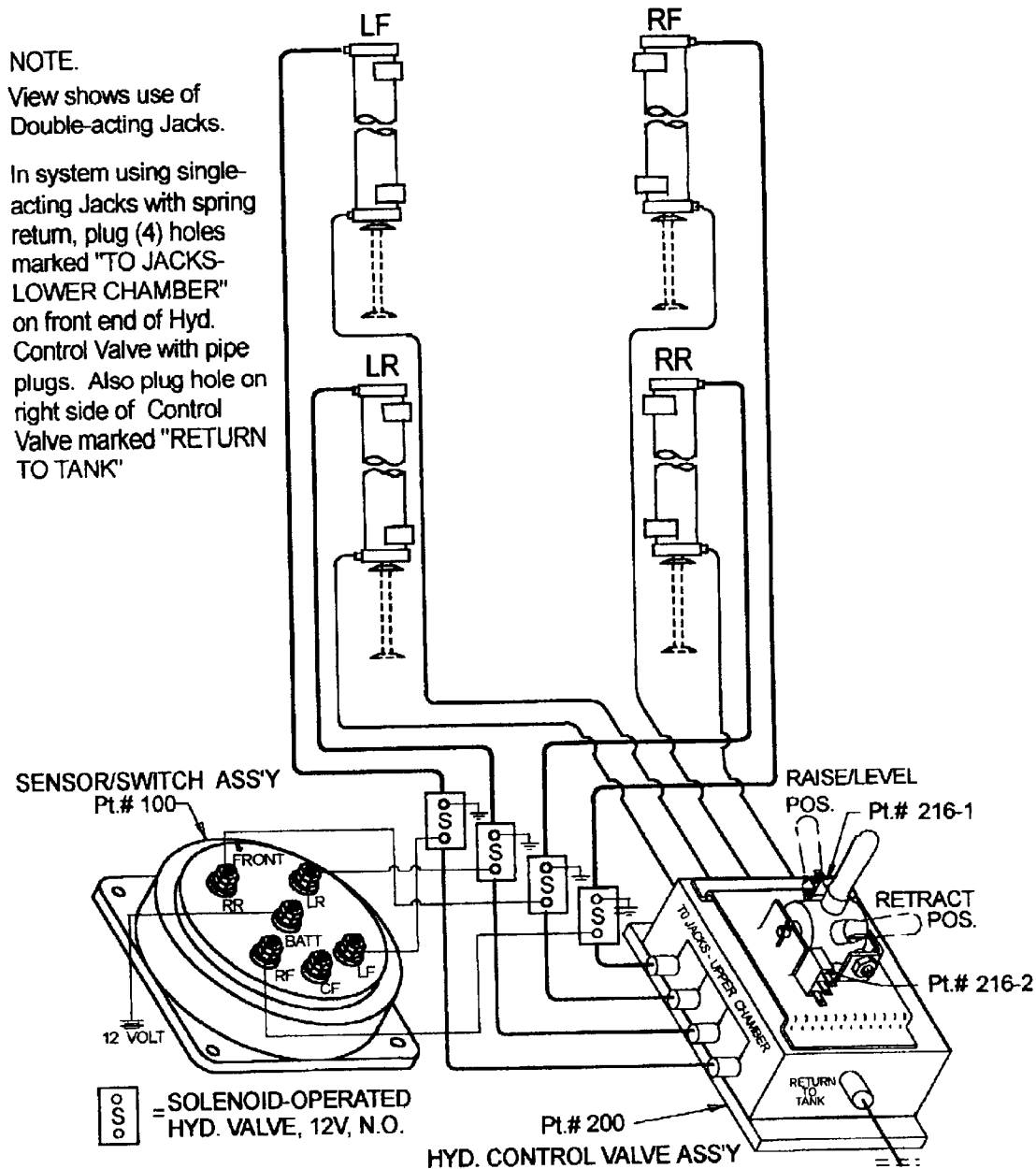

FIG. 3: Shows the Piping and Wiring requirements of the Sensor/Switch Ass'y, the Hydraulic Control Valve Ass'y., and the In-line Solenoid-Operated Hydraulic Valves for a 4-Jack system with instructions for the use of double-acting Jacks and for single-acting Jacks with spring return.

Figure 4:
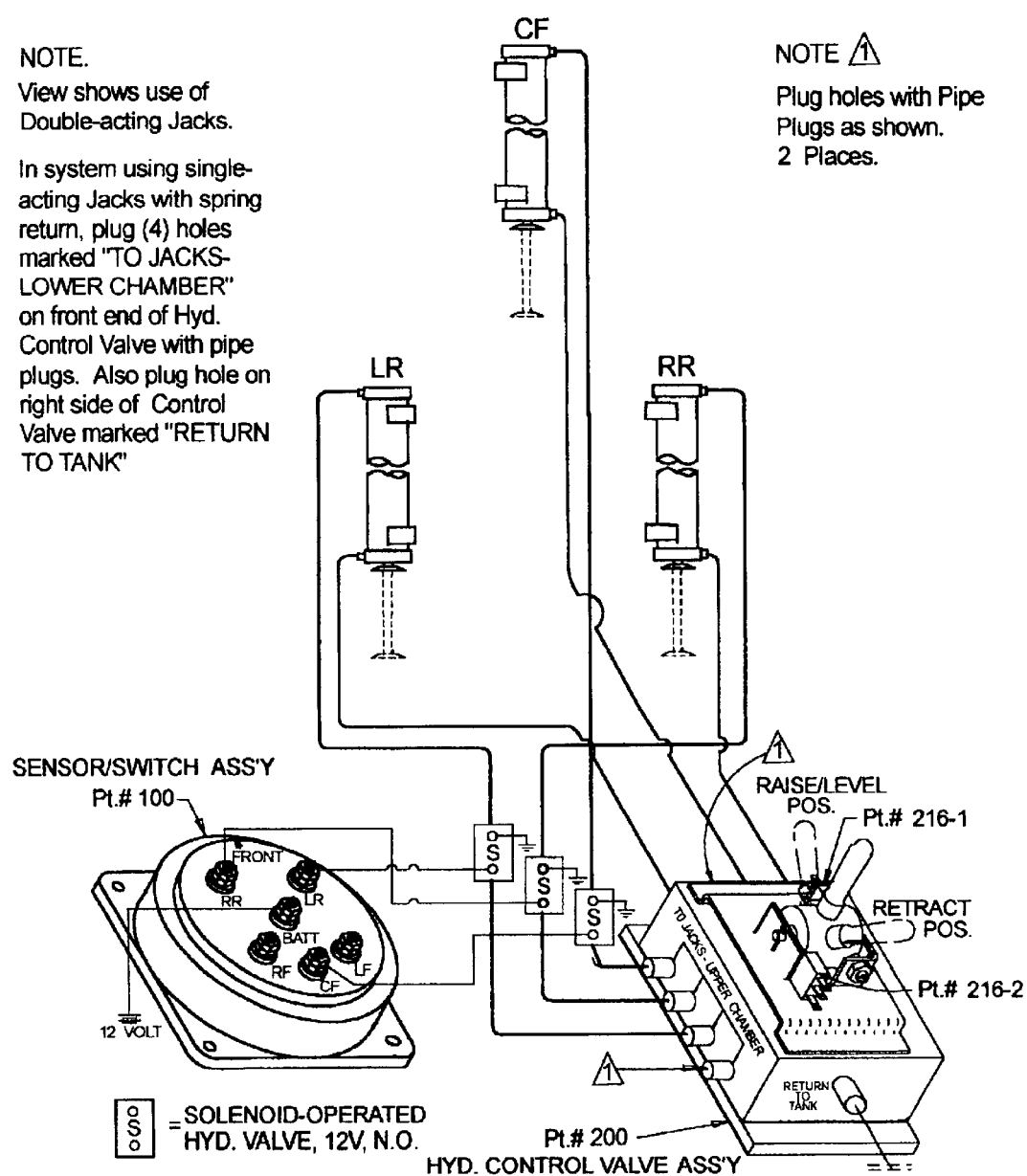

FIG. 4: Shows the Piping and Wiring requirements of a 3-Jack system. Includes instructions for use of double-acting Jacks and single-acting Jacks with spring return.

Figure 5:
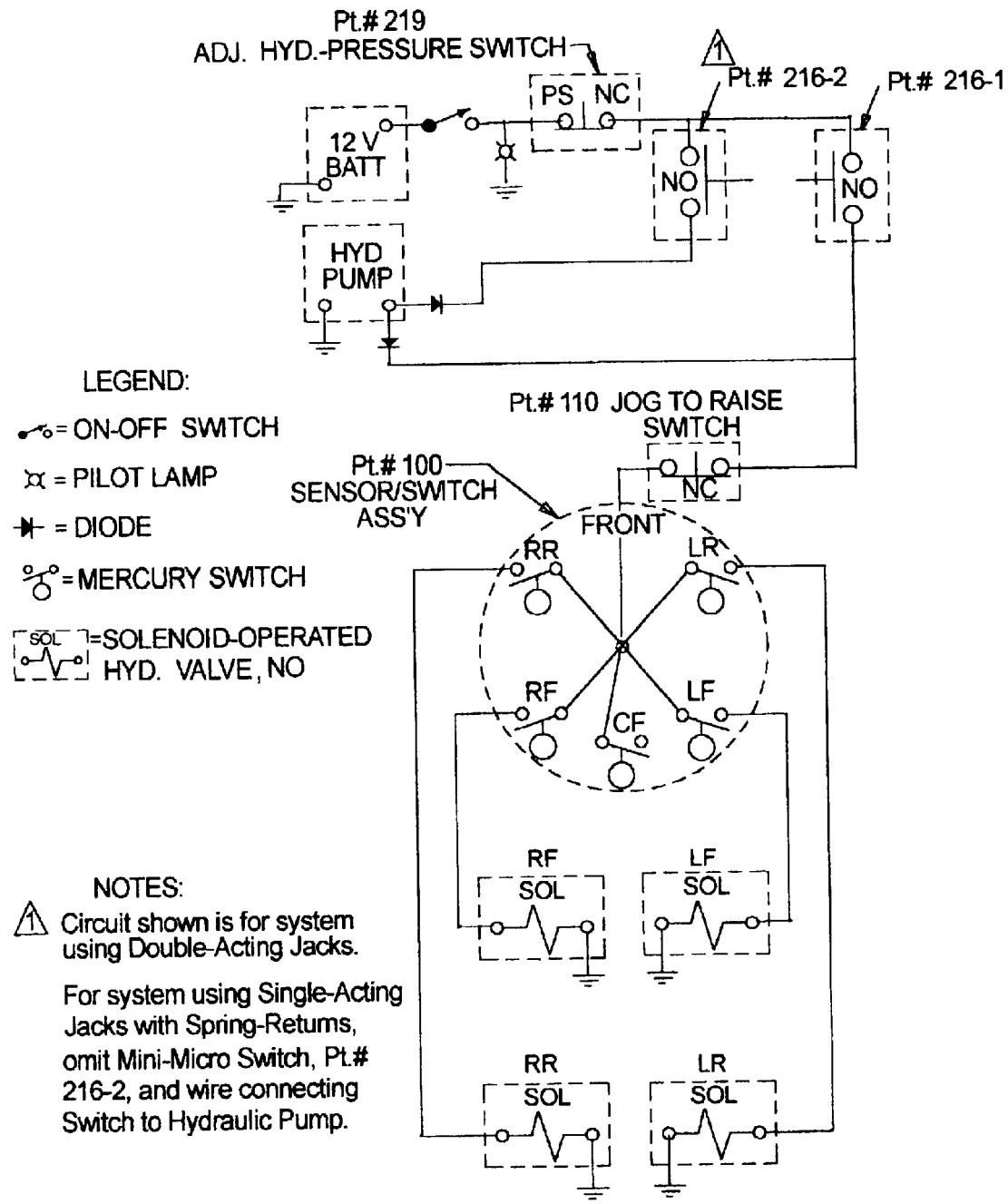
Figure 6:
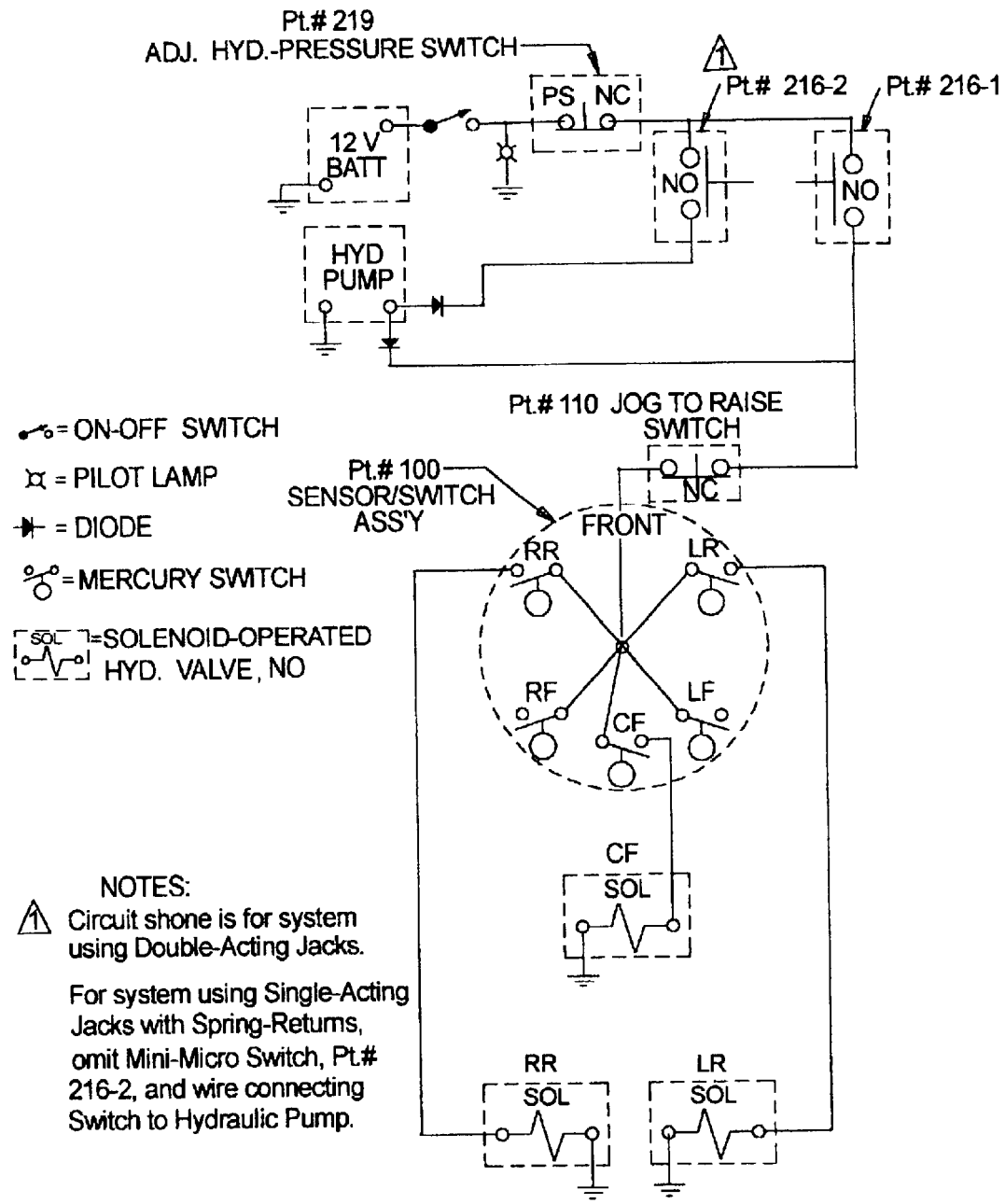
Figure 7A:
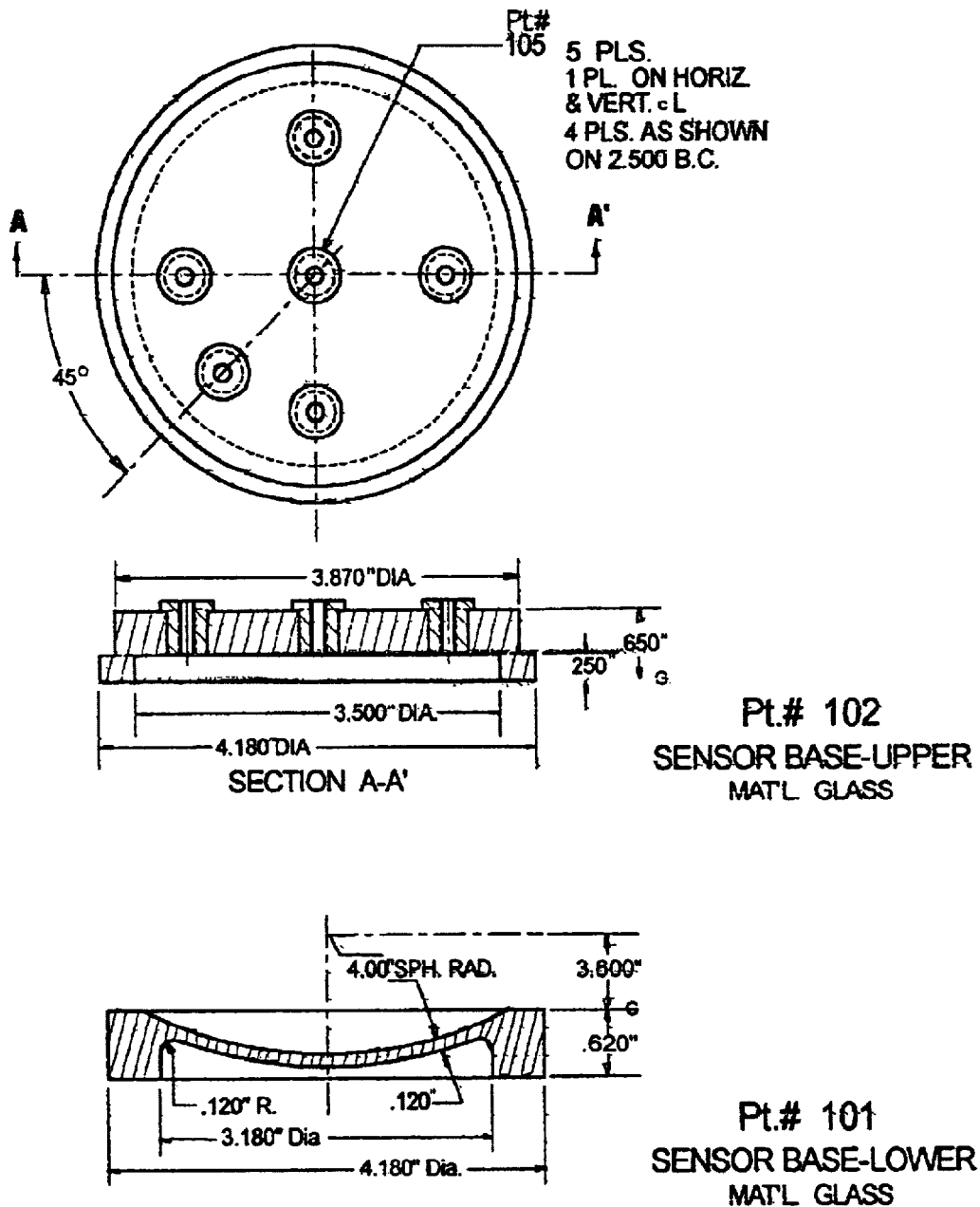
Figure 7B:
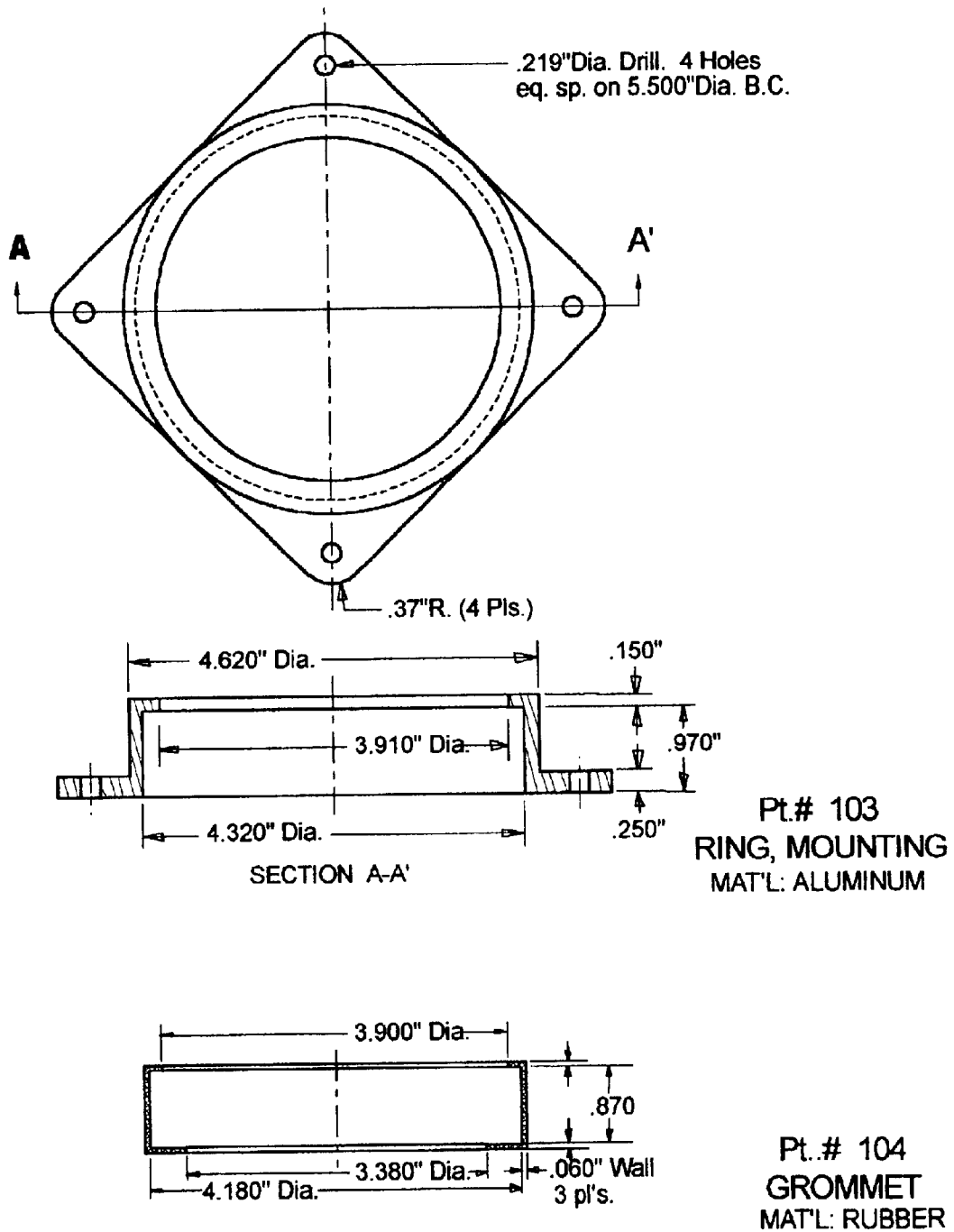
Figure 7C:
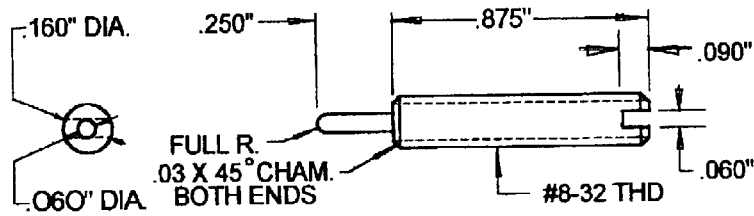
Figure 7C:
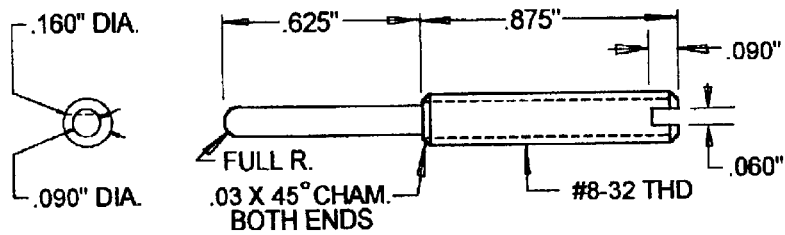
Figure 7C:
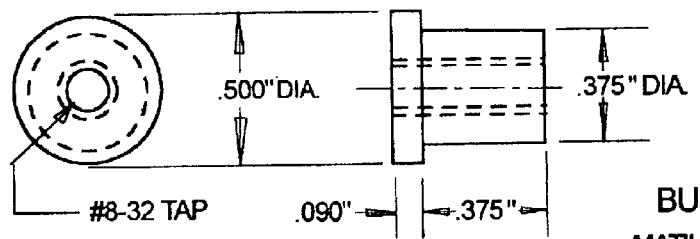

FIGS. 5 & 6: Shows the electrical circuits that will provide a completely automatic operation for the 4-Jack systems and the 3-Jack systems, respectively.

FIGS. 7, 7A, 7B, & 7C: Shows all the shape and dimensional criteria necessary to manufacture the Leveling Sensor/Switch Ass'y. 100-Series Part Numbers have been assigned in order to identify all the details, and notes have been added to direct the manufacturing of the Ass'y, and help to give a clear picture and understanding of their functions.

FIGS. 8, & 8A thru 8F: Shows all the shape and dimensional criteria necessary to manufacture the Hydraulic Control Valve Ass'y. 200-Series Part Numbers have been assigned in order to identify all the details, and notes have been added to direct the manufacturing of the Ass'y. and help to give a clear picture and understanding of their functions.

Figure 9:
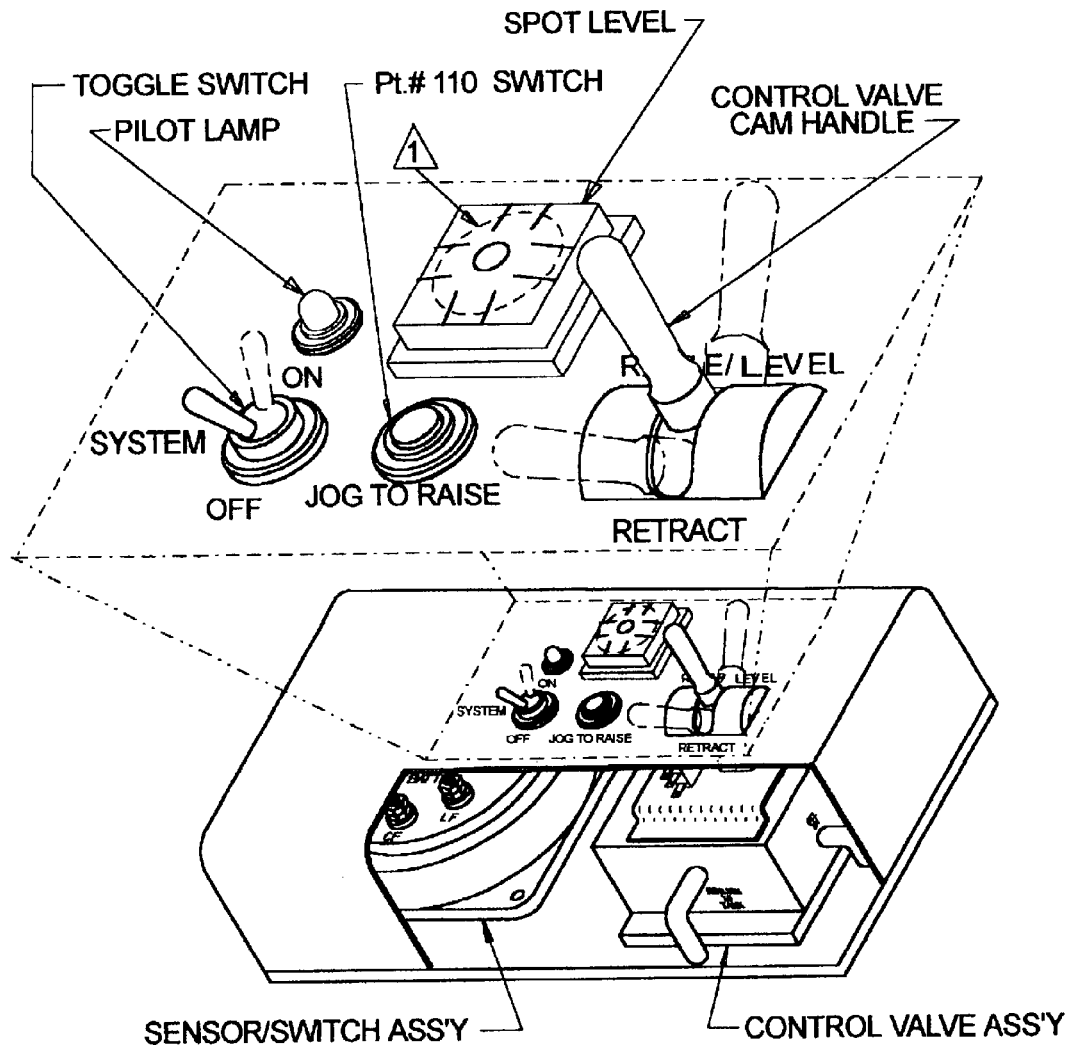

FIG. 9: Shows a concept of how the components can be packaged and to the simplicity of required panel instrumentation. It also suggests the addition of a Spot Level and Delta Note 1, which suggests marking the Spot Level to give the customer a visional refence on the maximum tilt allowable for all Jacks to reach the ground. This would eliminate a lot of possible trial and error to achieve a successful leveling with all Jacks on the ground.

DETAILED DESCRIPTION OF THE INVENTION

Figure 8:
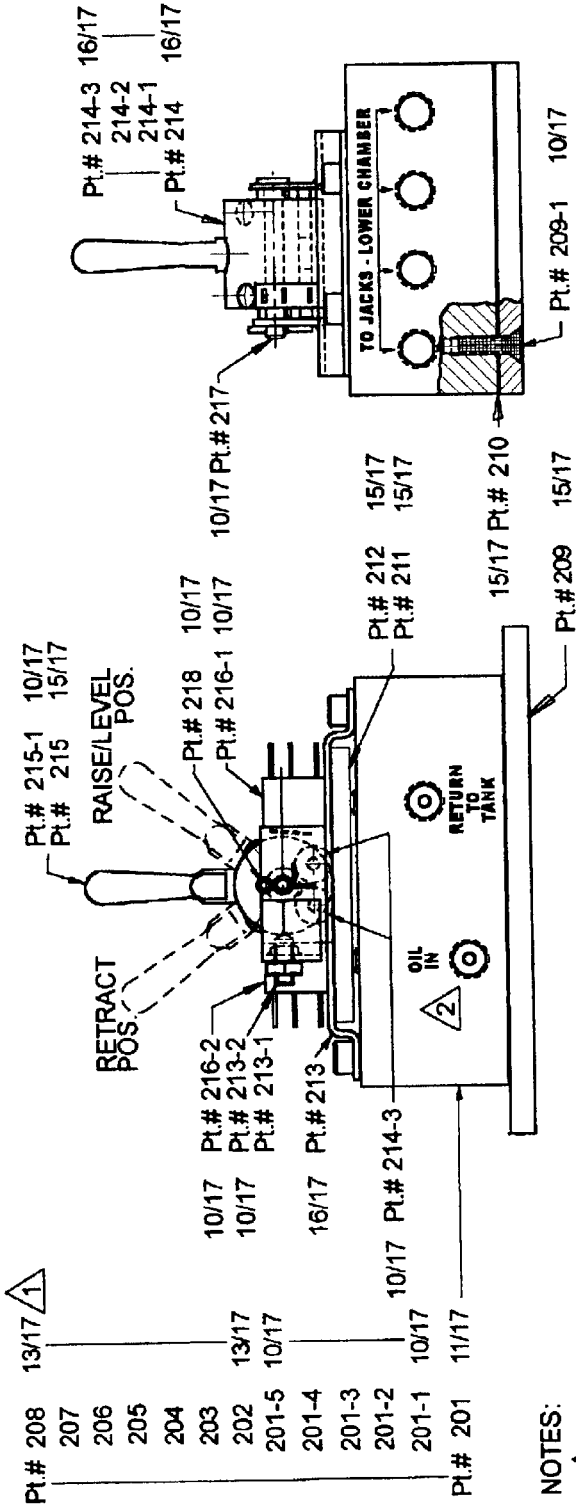
Figure 8A:
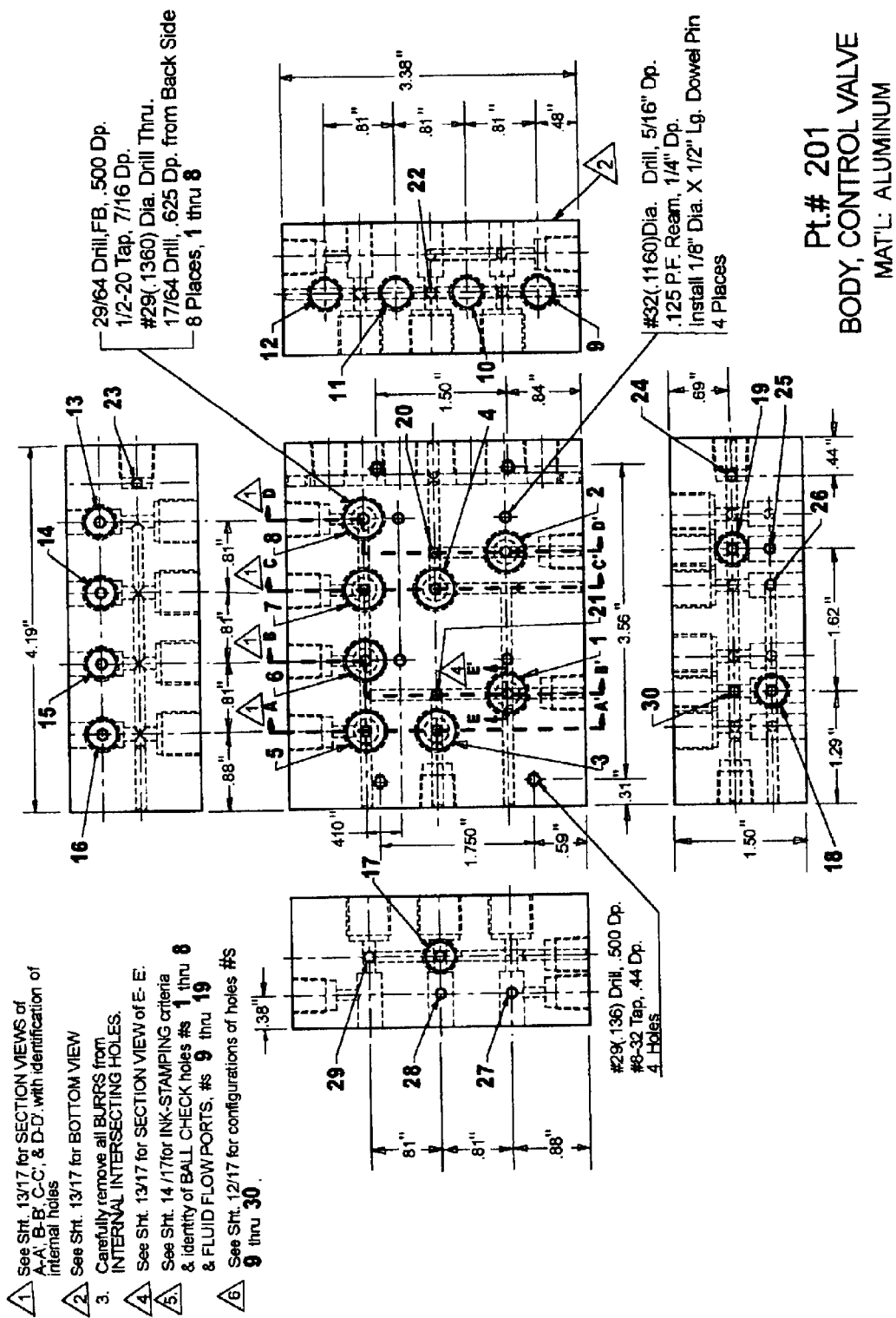
Figure 8C:
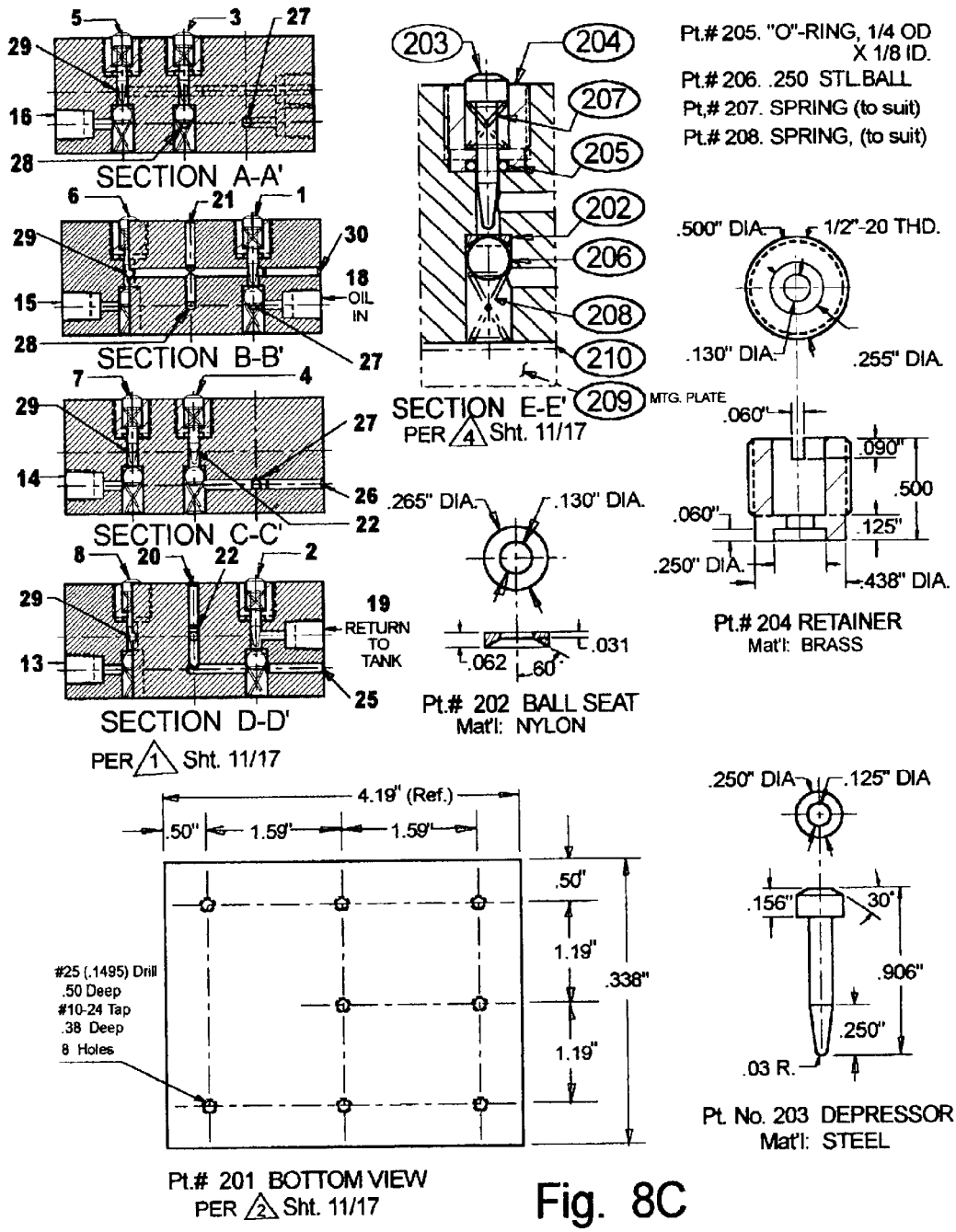
Figure 8D:
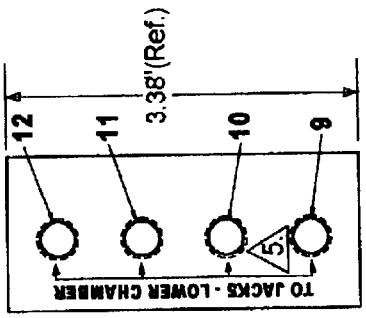
Figure 8D:
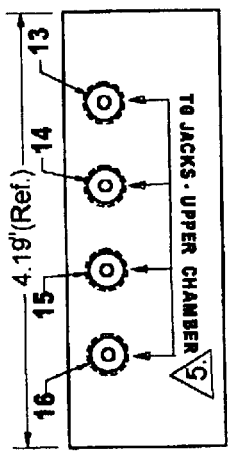
Figure 8D:
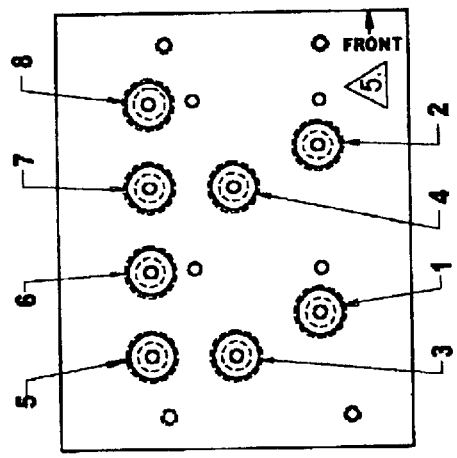
Figure 8D:
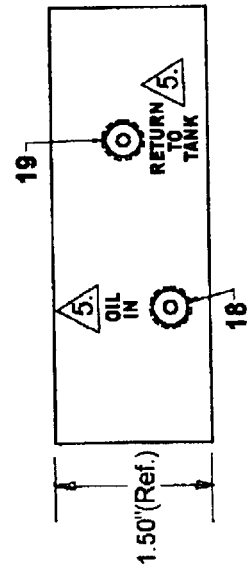
Figure 8D:
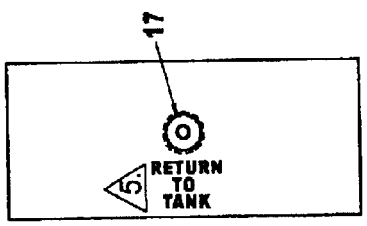

Fluid transfer from the Oil Reservoir & Pump to the Jacks & return is provided by the Hydraulic Control Valve, Pt.# 200 (See FIG. 8, etc.). To help explain the paths of fluid flow and the function of the Control Valve, all holes on the Control Valve Body, Pt.# 201, are identified by a bold numeral. Direction of fluid flow is accomplished thru (8) Ball-check Valves located in Hole No's. 1 thru 8 as shown in FIG. 8A, and comprised of Pt.#s 203 thru 208 as shown in Section E–E', on FIG. 8C. These Ball Checks have a fluid hole below the spring-loaded Ball & Seat and a fluid hole above the Ball & Seat. Fluid introduced thru the upper hole and on to the Ball can overcome the spring pressure against the Ball and continue on to the lower hole. Fluid introduced thru the lower hole is stopped by the spring-loaded Ball against the seat unless the Ball is depressed by Pt.# 203 (See FIG. 8C), allowing fluid to flow thru to the upper hole. Selective depressing of the Balls at these (8) Ball Checks controls the oil flow to the chambers of the Jacks and allows the oil from the opposite chambers of the Jacks to return the Oil Reservoir.

Figure 8E:
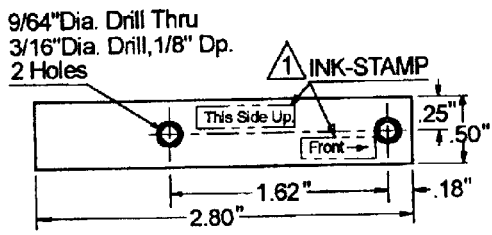
Figure 8E:
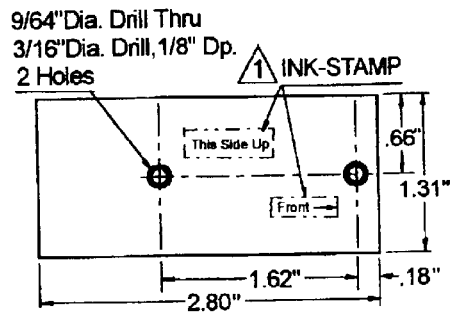
Figure 8E:
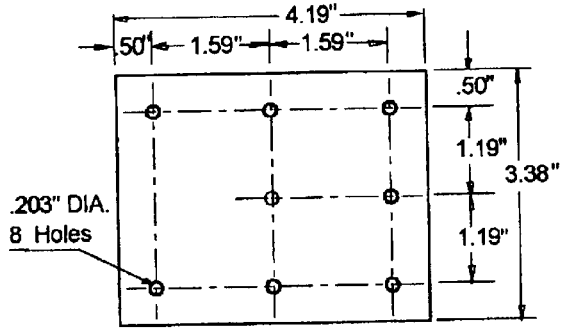
Figure 8E:
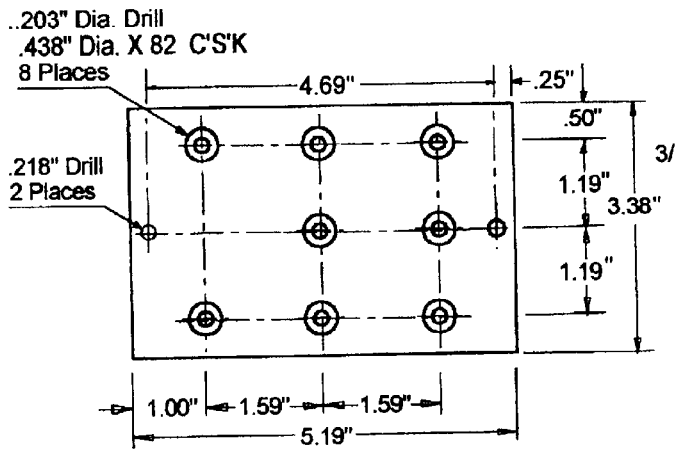
Figure 8E:
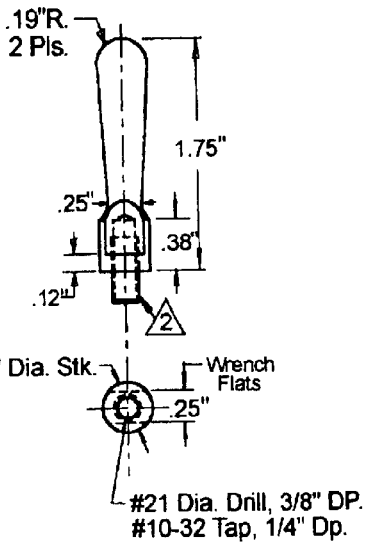
Figure 8F:
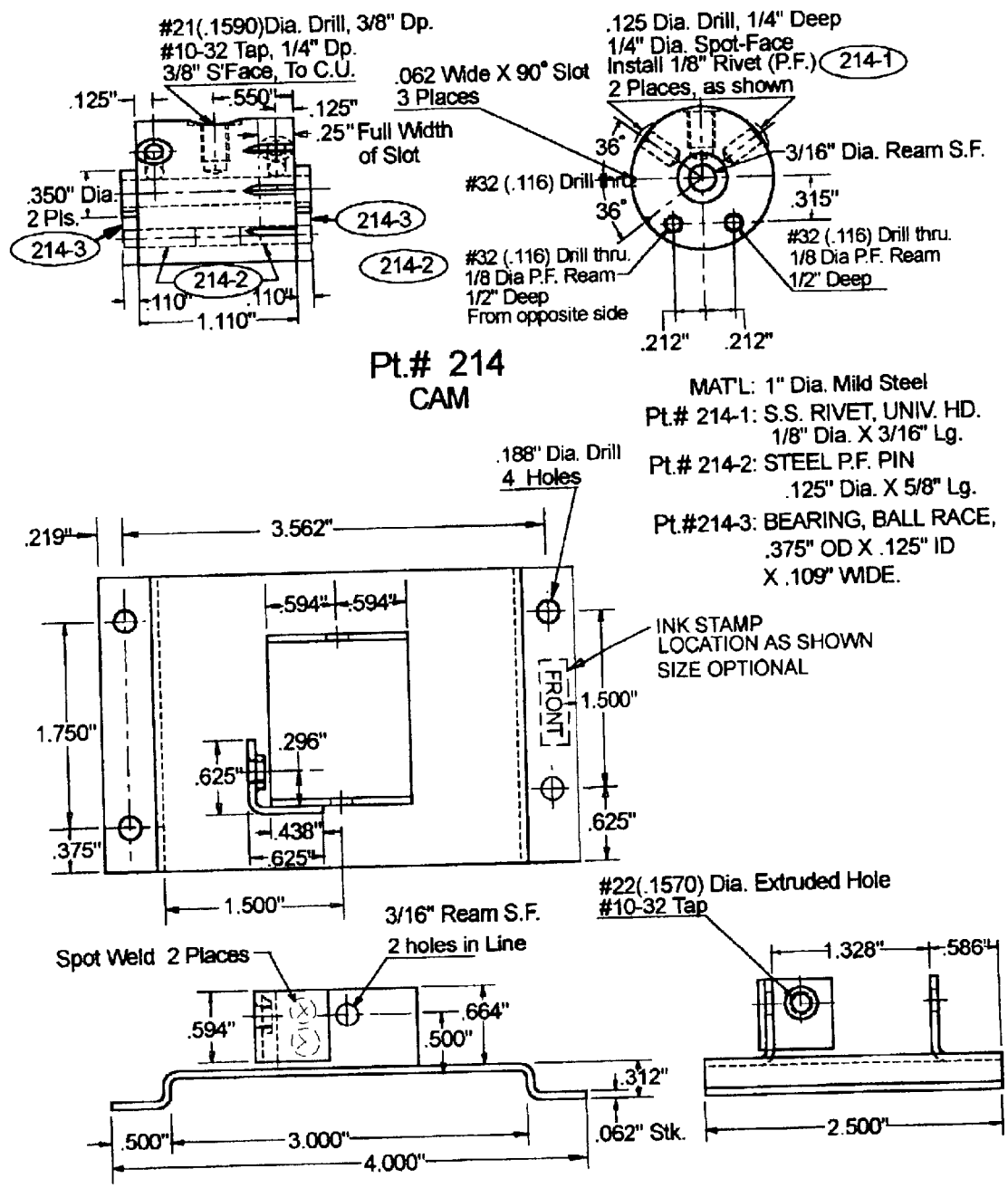

The Ball-Check Valves are depressed by either of (2) Plates, Pt.#s. 211 & 212 (See FIG. 8E). Pt.# 211 Plate is positioned over the Ball-Check Valves in holes 1 & 2. Pt.# 212 Plate is positioned over the Ball-Check Valves in holes 3, 4, 5, 6, 7, & 8 (See FIGS. 8 & 8A). the depressing of these Plates is accomplished by a sub-assembly of parts as shown on FIG. 8 and is comprised of the following parts: Pt.# 213 Bracket, Pt.# 214 Cam with (2) Pt.# 214-1 Rivets, (2) Pt.# 214-2 Steel Pins, (2) Pt.# 214-3 Ball Bearings, Pt.#s 215 & 215-1 Cam Handle, (1) ea. Pt.#s 216-1 & 216-2 Mini-Microswitches, (1) Pt.# 217 Steel Pin, and (1) Pt.# 218 Cotter Pin. (See FIGS. 8E & 8F for detailed drawings of these parts, and FIG. 8 for the Ass'y.).

When the Cam Handle is in the RAISE/LEVEL position, (See FIG. 2 & FIG. 8.), a button on the Cam, Pt.# 214-1, will have rotated into position to depress Mini-Microswitch Pt.# 216-1, supplying electric current to the Hydraulic Pump and the Sensor/Switch Ass'y. At the same time the Ball Bearing, Pt.# 214-3, will have rotated into position to depress Plate, Pt.# 211, which in turn depresses the Ball Valves in holes 1 & 2. Next, see SECTION B–B', FIGS. 8A & 8C. Oil from the Pump enters port at hole 18, and with Ball Valve in hole 1 being depressed, oil is allowed past the Ball and enters hole 30. It continues on to hole 29. Hole 29 connects holes 5, 6, 7, & 8, above the Ball Checks, (See FIG. 8A), so oil pressure will overcome spring pressure against the Balls and pass on to Ports 13, 14, 15, & 16 and on to the upper chambers of the Jacks. Note that since the Balls are not depressed, oil cannot flow back. This arrangement makes each Jack independent of the others. Note, also, on FIG. 8A, that Ports 9, 10, 11, & 12 are interconnected by holes 23 & 24. These Ports are the ones supplying oil to the lower Jack chambers in order to retract the Jacks if using double-acting Jacks. If using single-acting Jacks with spring return, these ports are not used and must be plugged. Also, when the Cam Handle is in the RAISE/LEVEL position and oil pressure is extending the Jacks, the oil pressure in the Lower Chambers of the double-acting Jacks must be relieved. So while in this mode and the Ball Valve in hole 2 being depressed, oil from the lower Jack chambers will return thru Ports 9, 10, 11, & 12 (See FIGS. 8A & 8C, Sect. D–D') thru holes 23 & 24, to hole 22, to hole 20, to hole 25, and entering hole 2 below the Ball, but with the Ball Valve being depressed, the oil is allowed past the Ball and out Port 19 and returned to the oil reservoir.

With the Cam Handle, Pt.# 215, in the RETRACT position (See FIG. 2 & FIG. 8), a Button, (Pt.# 214-1), will have rotated into position to depress Mini-Microswitch, Pt.# 216-2, supplying electric current to the Hydraulic Pump only. At the same time, Ball Bearing, Pt.# 214-3, will have rotated into position to depress Plate, Pt.# 212, which, in turn, depresses the Ball Valves in holes 3, 4, 5, 6, 7, & 8, (See Sect. C–C', FIGS. 8A & 8C). oil from pump enters at Port 18 (Sect. B–B'), and since Ball Valve in hole 1 is not depressed, oil will flow thru hole 27 to hole 26 to Ball Valve in hole 4. With Ball Valve in hole 4 now being depressed, oil is allowed past Ball to hole 22 to holes 23 & 24 and enter Ports 9, 10, 11, 12, which are the Ports to the Lower Chambers of the Jacks, thus retracting the Jacks. Since the Ball Valves in holes 5, 6, 7, & 8 are now depressed, oil can flow back past the Balls to hole 29 (See Section B–B') to hole 30, to hole 21, down to hole 28, and enter hole 3 below the Ball (See Section A–A'). With Ball Valve in hole 3 depressed, oil will go past the Ball and return to the oil reservoir thru Port 17.

The SENSOR/SWITCH ASS'Y, Pt.# 100, (See FIG. 7) shows the device to be essentially a Glass Vacuum Envelope. The bottom half of the Envelope, Pt.# 101, has a spherical-radius floor upon which the Liquid Mercury, Pt.# 109, will float. A conductor, Pt.# 106, located on the vertical center-line, is connected to an electrical source. It extends to the floor and thus is always in contact with the Mercury, regardless of the tilt of the device. This Center Conductor is surrounded by (5) Electrodes, Pt.# 107. Note that the final adjustments of these Electrodes relative to the surface of the Mercury puddle must be made per Delta Note 4 and while the unit is in a level position. And so with all electrodes in contact with the Mercury and current flowing thru the Mercury, a signal will go to all the Normally Open S.O. Valves to close and stop oil flow to the Jacks. Thus, as the unit begins to tilt, the Mercury puddle will glide away from certain Electrodes, depending on the direction of tilt and the opposite Electrodes will be immersed in the Mercury and cause electric current to flow from the Center conductor to the immersed Electrodes, and send a signal to the pertinent S.O. Valves to close and stop oil flow to those Jacks. Conversely, the Electrodes that are not in contact with the Mercury will have no current flowing to their respective S.O. Valves, allowing oil to flow to those Jacks. Also note that the markings at each Electrode on the Sensor/Switch Ass'y. is 180 degrees from its relative position with respect to the front of the vehicle, and the markings denote the respective Solenoid-Operated In-line Hydraulic Valve to which that Electrode is to be connected. Hence, the wire from the Electrode at the left front of the Sensor/Switch and marked RR(Right Rear) should be connected to the S.O. Valve in the oil line to the Right Rear Jack on the vehicle. The RF Electrode is connected to the S.O. Valve in the oil line of the Right Front Jack of the vehicle, and so on and so forth.(See FIGS. 3 & 4).

Two Switch components in the circuitry not yet addressed are the Adjustable HydraulicPressure Limit Switch, Pt.# 219 (See FIGS. 5 & 6, and FIG. 8, Note delta 2), and the "JOG TO RAISE" Switch, Pt.# 110 (See FIGS. 5 & 6, and FIG. 7 Bill of Material). The Hyd. Pressure Limit Switch, Pt.# 219, should be set to interrupt the electric current at a slightly higher line pressure than required to lift the entire vehicle. It is installed in the hydraulic in-put supply line somewhere before entering the Hydraulic Control Valve, Pt.# 200. Its purpose is to provide the automatic feature of the leveling system by cutting off electric current to the Hydraulic Pump after the vehicle reaches the level attitude and all S.O. Valves are in Stop Mode. The purpose of the "JOG TO RAISE" switch is to override the automatic level feature when wanting to continue raising the vehicle after reaching the level attitude. It is a normally closed momentary switch. Holding the button down stops the electric current to the S.O. Hyd. In-line Valves, allowing fluid flow on to the Jacks, such as, in the case of a pick-up camper to raise the camper from the ground and place it on the pick-up bed and to remove it when desired. Another use of the "JOG TO RAISE" switch is to assure that all Jacks reach the ground in a 4-Jack system. Starting from an out of level condition, the Jacks at the low end of the vehicle will start extending, while the Jacks at the high end may never receive a signal to extend before the vehicle reaches level and the system shuts down. If all Jacks have not reached the ground when the vehicle reaches level and automatically shuts down, the lack of current to the S.O. Valves will open these valves. This will cause a line pressure relievement to the unextended Jacks and consequently restart the Pump and close the S.O. Valves, again building up excessive line pressure and again shutting down,etc. At this time, the Operator should depress and hold the "JOG TO RAISE" button, which will cut off current to the S.O. Valves, opening them all to flow. The current to the Pump will remain ON and oil will flow to the lines of the least resistance, namely, to the unextended Jacks. The Operator should continue to keep the "JOG TO RAISE" switch depressed until he sees the vehicle start to lose level.

At this time, He can release the button and the automatic system will take over and relevel the vehicle and shut down, this time with all Jacks firmly on the ground. The Operator can then return the Cam Handle to the central position and switch the system power to OFF. Or, if he chooses, he can leave the Cam Handle in the RAISE/LEVEL position and the System will remain in "Sleep" Mode. If the vehicle should for any reason fall out of level, the System will "Awaken" to relevel the vehicle and shut down. And so on into the night.

What is claimed is:

1. A Sensor/Switch Assembly Unit for an automatic vehicle leveling system, having a plurality of jacks, comprising:

a glass cylindrical envelope having a spherical concaved floor on which floats a pool of liquid mercury, the top surface of which always describes a plane of true level;

a conductor electrode protruding through the top center of said envelope and penetrating the pool of mercury such as to provide it with electric current;

a plurality of electrodes protruding through the top of said envelope placed radially consistent with the relative locations of the jacks to the longitudinal and transverse axes of the vehicle, the tips of said electrodes to describe a plane parallel to the plane of the vehicle, all the tips contacting the mercury when the vehicle is on a level plane, the electrodes sending a signal to their respective jacks when immersed in mercury to level the vehicle.

2. A Hydraulic Control Valve Unit for an automatic vehicle leveling system, which is comprised of the following elements:

a body with a port for incoming hydraulic fluid, four ports to supply hydraulic fluid to upper chambers of two-way leveling jacks, four ports to supply hydraulic fluid to lower chambers of said jacks, two ports to return the fluid from the chambers of the jacks to a fluid source tank when the opposite chambers of said jacks are being pressurized;

a network of fluid lines connecting the incoming fluid port with the other ports;

eight spring-loaded ball-check valves in the lines to control the direction and flow of the hydraulic fluid;

a first plate positioned over two of the ball-check valves;

a second plate positioned over the other six ball-check valves;

a lever-operated selector to direct the fluid flow to the upper or lower chamber of the jacks and open lines to allow fluid from the opposite jack chambers to return to the source tank by engaging one of the two plates to depress the respective ball-check valves to perform a leveling or retracting function of the vehicle.

* * * * *